(12) United States Patent
Marshall et al.

(10) Patent No.: US 7,609,409 B2
(45) Date of Patent: *Oct. 27, 2009

(54) LASER PRINT APPARATUS THAT GENERATES PULSE WIDTH VALUE AND JUSTIFICATION VALUE BASED ON PIXELS IN A MULTI-BIT IMAGE

(75) Inventors: John D. Marshall, Boise, ID (US); Douglas G. Keithley, Boise, ID (US)

(73) Assignee: Marvell International Technology Ltd. (BM)

(*) Notice: Subject to any disclaimer, the term of this patent is extended or adjusted under 35 U.S.C. 154(b) by 0 days.

This patent is subject to a terminal disclaimer.

(21) Appl. No.: 11/868,825

(22) Filed: Oct. 8, 2007

(65) Prior Publication Data

US 2008/0030783 A1 Feb. 7, 2008

Related U.S. Application Data

(63) Continuation of application No. 10/365,563, filed on Feb. 12, 2003, now Pat. No. 7,280,246.

(51) Int. Cl.
G06K 15/00 (2006.01)
G06F 3/12 (2006.01)

(52) U.S. Cl. ........................ 358/1.16; 358/1.8

(58) Field of Classification Search ............ 358/1.1, 358/1.8, 1.9, 1.12, 1.13, 1.15, 1.18, 2.99, 358/3.01, 3.09, 3.2, 3.21, 3.27
See application file for complete search history.

(56) References Cited

U.S. PATENT DOCUMENTS

| | | | |
|---|---|---|---|
| 3,916,096 A * | 10/1975 | Everett et al. | 358/3.06 |
| 5,313,287 A | 5/1994 | Barton | 358/458 |
| 5,386,302 A * | 1/1995 | Kashihara et al. | 358/448 |
| 5,515,480 A | 5/1996 | Frazier | 358/1.9 |
| 5,761,325 A | 6/1998 | Barton | 382/100 |
| 5,809,217 A | 9/1998 | Bunce | 358/1.9 |
| 5,898,505 A | 4/1999 | Lin et al. | 358/298 |
| 5,982,508 A * | 11/1999 | Kashihara | 358/3.08 |
| 6,028,677 A | 2/2000 | Keithley | 358/1.9 |
| 6,178,011 B1 | 1/2001 | Lin et al. | 358/1.9 |

(Continued)

FOREIGN PATENT DOCUMENTS

JP    01-290427    11/1989

(Continued)

OTHER PUBLICATIONS

Search report from UK counterpart application No. GB0402801.5 dated Jun. 8, 2004 (one page).

*Primary Examiner*—Gabriel I Garcia

(57) ABSTRACT

A laser print apparatus includes a memory for storing a multi-bit image including a plurality of pixels. Each pixel is represented by an N-bit value, wherein N is greater than one. A modulation code generator analyzes three adjacent pixels. The three adjacent pixels include a left pixel, a center pixel, and a right pixel. The modulation code generator is configured to generate a pulse width value based on the value of the center pixel, and a justification value based on the values of the left pixel and the right pixel. A laser print engine forms an output pixel on media based on the pulse width value and the justification value.

23 Claims, 8 Drawing Sheets

U.S. PATENT DOCUMENTS

| | | | |
|---|---|---|---|
| 6,249,355 B1 | 6/2001 | Trask | 358/1.9 |
| 6,335,989 B1 | 1/2002 | Lin | 382/260 |
| 6,362,898 B1 | 3/2002 | McDonald | 358/1.7 |
| 6,369,911 B1 | 4/2002 | Hattori | 358/1.9 |
| 6,377,361 B1 | 4/2002 | Sakaue et al. | 358/1.9 |
| 2002/0071024 A1* | 6/2002 | Luman | 347/237 |
| 2002/0085217 A1 | 7/2002 | Sakaue et al. | 358/1.9 |
| 2003/0151774 A1 | 8/2003 | Washio | 358/3.13 |

FOREIGN PATENT DOCUMENTS

JP 5022544 1/1993

* cited by examiner

LASER PRINT APPARATUS THAT GENERATES PULSE WIDTH VALUE AND JUSTIFICATION VALUE BASED ON PIXELS IN A MULTI-BIT IMAGE

CROSS-REFERENCE TO RELATED APPLICATION

This application is a continuation of application Ser. No. 10/365,563, filed Feb. 12, 2003 and issued as U.S. Pat. No. 7,280,246, which is hereby incorporated by reference.

BACKGROUND

1. The Field of the Invention

The present invention generally relates to laser printers, and more particularly to a laser print apparatus that generates a pulse width value and a justification value based on pixels in a multi-bit image.

2. Background of the Invention

Color and gray value digital images are both composed of picture elements (pixels), each pixel represented by multiple binary bits that define either a color or a gray level. In order to represent such an image on a bi-level (black/white) printer, the pixel data, if not already gray level, is typically converted into a gray level multi-bit value (e.g., 8 bits per pixel). The individual gray level pixels are then typically converted to binary level pixels through use of a digital halftoning process.

Digital halftoning is the process of transforming a continuous-tone image into a binary image that has the illusion of the original continuous tone image, using a careful arrangement of binary picture elements. The process is also called spatial dithering. In the case of color images, the color continuous-tone image is typically separated into color channels first. Separate halftones are then formed for each of the color channels.

Resolution enhancement technology (RET) has been used to smooth out the 1-bit data generated by halftoning algorithms. RET is typically implemented with a large block of dedicated hardware, and typically buffers several lines of data. RET is a hardware intensive technology that takes I-bit data and reduces the jagged edges that are noticeable at lower resolutions. RET uses template matching on the 1-bit data to essentially guess what the original smooth shapes of the image features were in the grayscale image (i.e., prior to halftoning). RET typically compares a window (e.g., 7.times.9 pixels) of the 1-bit data with hundreds of templates to identify features (e.g., a diagonal line, the top of the letter "O", etc.) in the window. The window is moved around the entire 1-bit image to identify features throughout the entire image. Laser modulation codes are generated based on the results of the template matching. The laser modulation codes are used to modulate a laser in the printer in a manner that results in the jagged edges being removed or reduced in the printed output.

SUMMARY

One form of the present invention provides a laser print apparatus. The apparatus includes a memory for storing a multi-bit image including a plurality of pixels. Each pixel is represented by an N-bit value, wherein N is greater than one. A modulation code generator analyzes three adjacent pixels. The three adjacent pixels include a left pixel, a center pixel, and a right pixel. The modulation code generator is configured to generate a pulse width value based on the value of the center pixel, and a justification value based on the values of the left pixel and the right pixel. A laser print engine forms an output pixel on media based on the pulse width value and the justification value.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
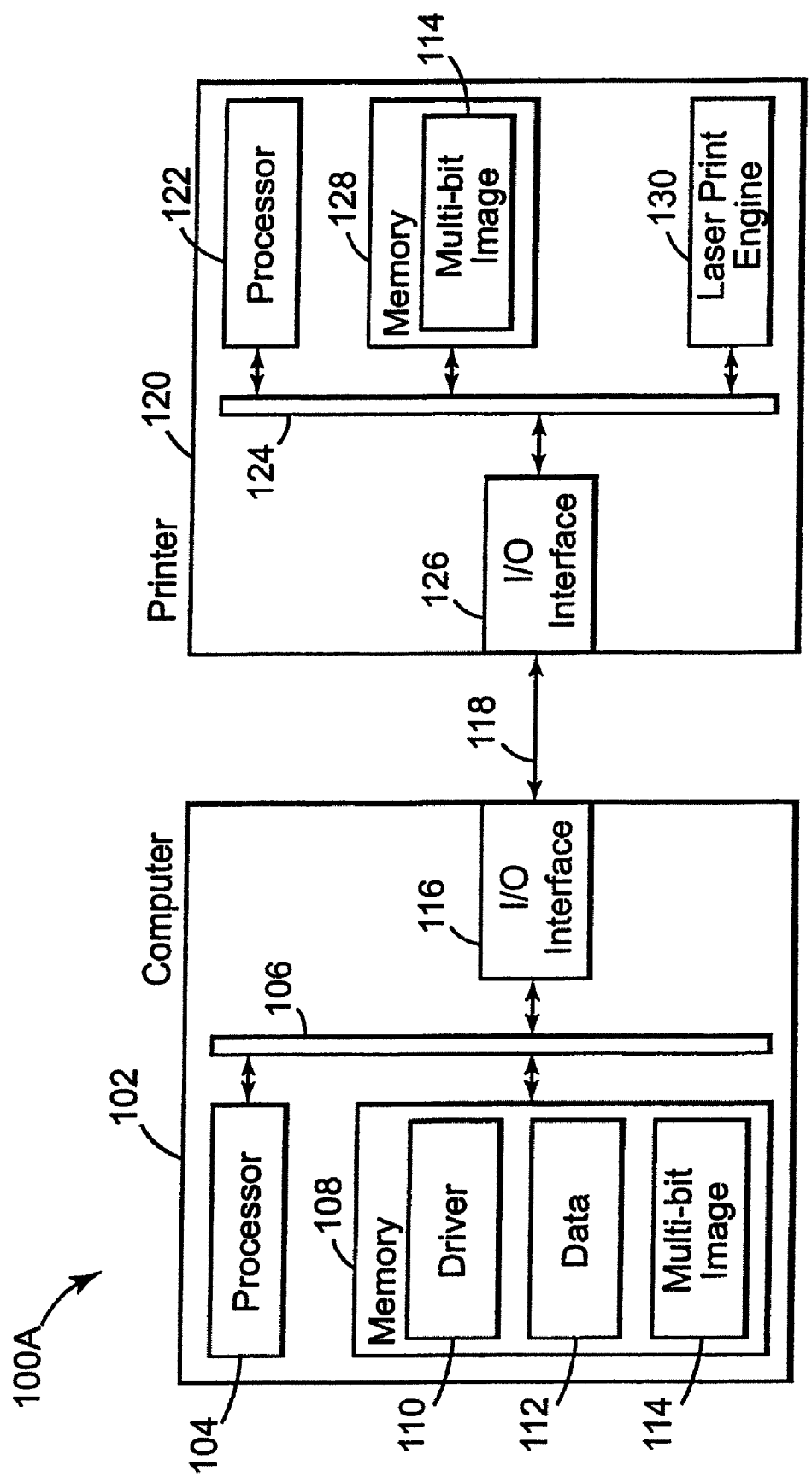
FIG. 1A is a block diagram illustrating major components of a printing system according to one embodiment of the present invention.

FIG. 1A is a block diagram illustrating major components of a printing system 100A according to one embodiment of the present invention. Printing system 100A includes computer 102 and printer 120. In one embodiment, printer 120 is a laser printer or laser print apparatus.

Computer 102 includes processor 104, memory 108, and input/output (I/O) interface 116, which are communicatively coupled together via bus 106. Driver 110, data 112 to be printed, and multi-bit image data 114 are stored in memory 108. In one embodiment, driver 110 is executed by processor 104 to render the data 112 to be printed into multi-bit image data 114. The data 112 to be printed may be any type of printable data, such as image files, word processing files, etc. In one form of the invention, multi-bit image data 114 includes a plurality of pixels, with each pixel being represented by a multi-bit value (i.e., each pixel is represented by an N-bit value, where N is greater than one). In one embodiment, each pixel in multi-bit image data 114 is represented by a 2-bit value (e.g., black, white, and two gray levels). In another embodiment, each pixel in multi-bit image data 114 is represented by a 4-bit value.

Printer 120 includes processor 122, I/O interface 126, memory 128, and laser print engine 130, which are communicatively coupled together via bus 124. I/O interface 126 of printer 120 and I/O interface 116 of computer 102 are coupled together via communication link 118. In one embodiment, I/O interfaces 116 and 126 are serial interfaces, such as universal serial bus (USB) interfaces, and communication link 118 is a USB cable. In another embodiment, I/O interfaces 116 and 126 are network interfaces, and communication link 118 is a network, such as a local area network. In other embodiments, other types of interfaces and communication links may be used, including those for wireless communications.

After rendering data 112 into multi-bit image data 114, computer 102 outputs the multi-bit image data 114 to printer 120 via communication link 118. As shown in FIG. 1A, the received multi-bit image data 114 is stored in memory 128 of printer 120, where it is retrieved and processed by laser print engine 130 as described in further detail below with reference to FIGS. 2-5.

Figure 1B:
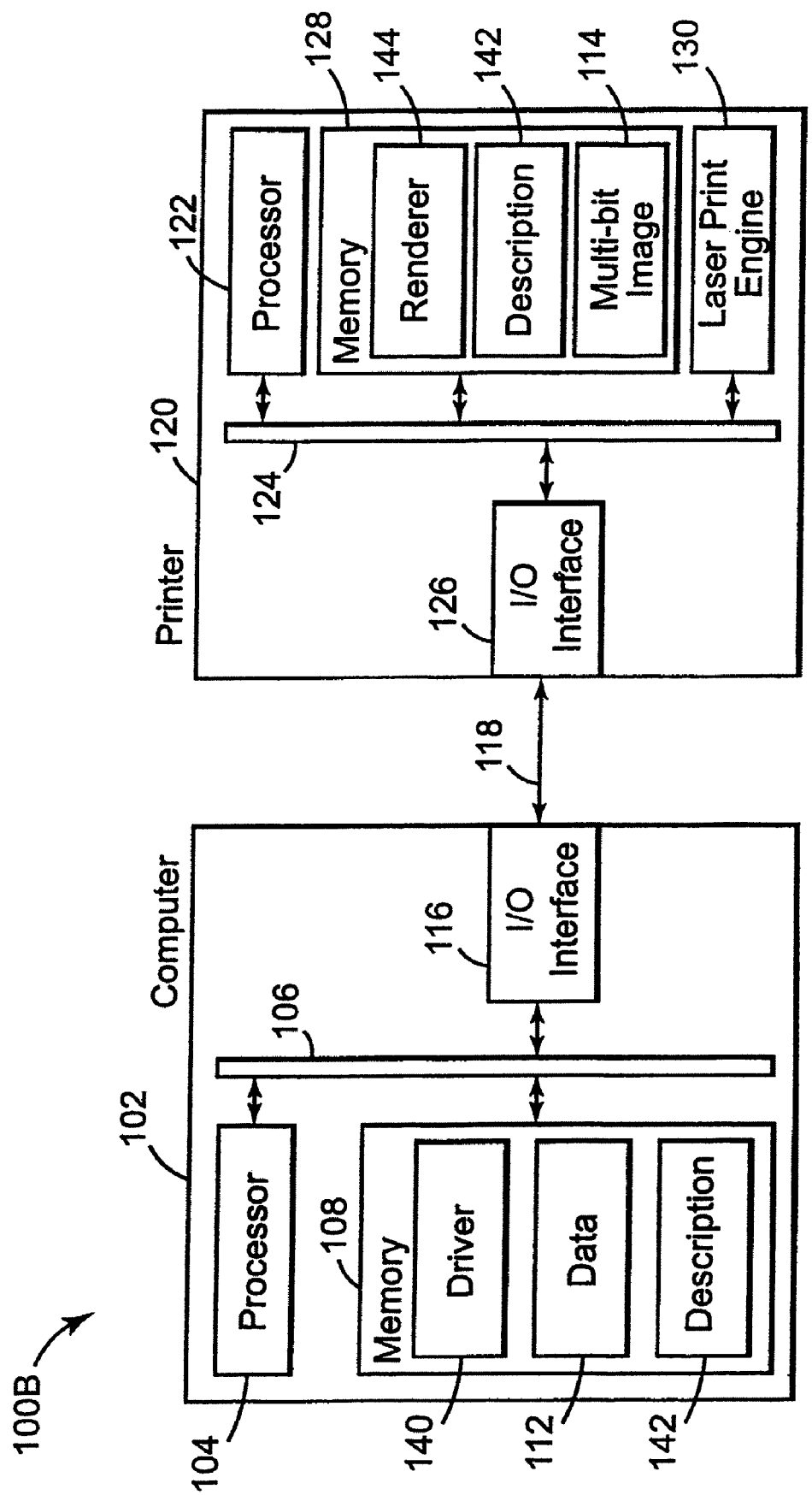
FIG. 1B is a block diagram illustrating major components of a printing system according to another embodiment of the present invention.

FIG. 1B is a block diagram illustrating major components of a printing system 100B according to another embodiment of the present invention. In the illustrated embodiment, printing system 100B includes the same hardware as printing system 100A. But in system 100B, the multi-bit image data 114 is rendered in the printer 120, rather than the computer 102. In one embodiment, driver 140 converts data 112 to be printed into a description file 142. In one form of the invention, driver 140 is a printer command language (PCL) driver for converting the data 112 into a description file 142 that includes data and high level commands (e.g., place a Helvetica 12 point letter "Q" at location x,y on the page). Computer 102 transfers the description file 142 to printer 120 via communication link 118, and printer 120 stores the file 142 in memory 128. Processor 122 then renders the description file 142 into multi-bit image file 114. In one embodiment, printer 120 includes PCL firmware for rendering the description file 142 into multi-bit image file 114. The multi-bit image file 114 is stored in memory 128 of printer 120, where it is retrieved and processed by laser print engine 130 as described in further detail below with reference to FIGS. 2-5.

Figure 2:
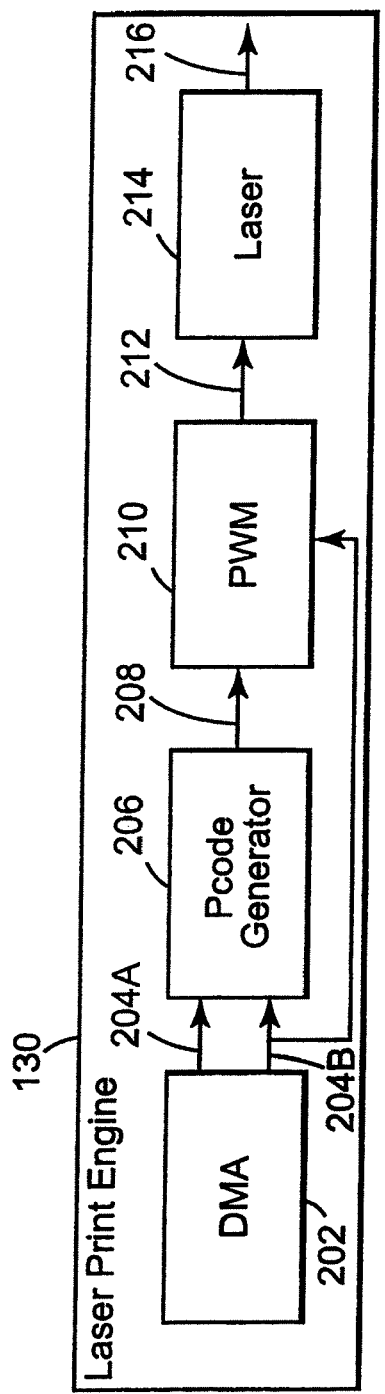
FIG. 2 is a block diagram illustrating major components of the laser print engine shown in FIGS. 1A and 1B according to one embodiment of the present invention.

FIG. 2 is a block diagram illustrating major components of the laser print engine 130 shown in FIGS. 1A and 1B according to one embodiment of the present invention. Laser print engine 130 includes direct memory access (DMA) hardware 202, pcode generator 206, pulse-width modulator (PWM) 210, and laser 214. DMA 202 reads the multi-bit image data 114 from printer memory 128, and outputs a data signal 204A and a latch signal 204B to pcode generator 206. DMA 202 also outputs the latch signal 204B to pulse-width modulator 210. In one embodiment, DMA 202 reads the multi-bit image data 114 from memory 128 in strips (e.g., image data for a one inch long by full page wide strip), and outputs one pixel of data (e.g., 4 bits) at a time to pcode generator 206. In one form of the invention, multi-bit image data 114 is compressed, and is then decompressed in strips so that only a small portion of a page is actually in memory 128 in raw multi-bit image format at one time.

Pcode generator 206 generates "pcodes" 208 based on the data 204A received from DMA 202. Pcodes 208 (also referred to as laser modulation codes) are described in further detail below. Pcode generator 206 outputs the pcodes 208 to pulse-width modulator 210. Pulse-width modulator 210 generates a pulse-width modulated laser drive signal 212 based on the pcodes 208 received from pcode generator 206 and latch signal 204B from DMA 202. The laser drive signal 212 is also referred to as a video signal. Laser 214 outputs a modulated laser light beam 216 (e.g., on/off binary modulation) based on the laser drive signal 212.

It will be understood by persons of ordinary skill in the art that, in addition to the elements illustrated in FIG. 2, one embodiment of laser print engine 130 will also include conventional laser printer elements (not shown) for forming an image on media, such as a rotating polygonal mirror to deflect the laser beam 216, a photoconductive drum, toner dispensers, media handlers, as well as other elements.

To form an image on media according to one embodiment, laser print engine 130 performs a conventional electrophotographic printing process in response to laser drive signal 212. At any particular time, signal 212 identifies whether laser 214 is providing beam 216 or not providing a beam. Such consecutive particular times define a dot (output pixel) of an image to be formed on the media. In one embodiment, printer 120 outputs 600 dots per inch (dpi), so a dot may be output every $\{\text{fraction }(1/600)\}^{th}$ of an inch. In another embodiment, printer 120 outputs 1200 dpi, so a dot may be output every $\{\text{fraction }(1/1200)\}^{th}$ of an inch.

A fixed amount of space is allotted for each output pixel (e.g., $\{\text{fraction }(1/600)\}^{th}$ of an inch or $\{\text{fraction }(1/1200)\}^{th}$ of an inch). Correspondingly, as laser beam 216 is scanned across the drum, the beam 216 spends a certain amount of time scanning from left to right across each output pixel, which is referred to as the pixel time. The appearance of the resulting dot will be affected by the times that the laser 214 is turned on and off during a pixel time, and the total duration of on time of the laser 214 during the pixel time.

In one embodiment, pcode generator 206 generates a pcode 208 for each output pixel in the image to be formed on the media. In one form of the invention, each pcode 208 includes a pulse width value that is indicative of the length of time laser 214 is turned on over a given output pixel position, and a justification value corresponding to the position of the laser pulse within a given output pixel position. The pulse position may be set at the beginning of the scan of a given output pixel (left justified), centered in the time allotted to the output pixel (center justified), set at the end of the scan of the output pixel (right justified), or split between the beginning and the end of the scan of the output pixel (split justified). In one embodiment, the laser 214 is left on during the transition from one output pixel to the next output pixel for certain types of justifications (e.g., an output pixel with right or split justification, followed by an output pixel with left or split justification).

In one embodiment, each pcode 208 includes a 6-bit pulse width value to identify one of sixty-four different pulse widths, and a 2-bit justification value to identify one of four different justifications (e.g., left justified, right justified, center justified, and split justified). With a 6-bit pulse width value, each output pixel is essentially divided into $\{\text{fraction }(1/64)\}^{th}$ increments, and the pulse width value indicates a fraction of the output pixel that the laser 214 is to be turned on (e.g., $\{\text{fraction }(1/64)\}^{th}$ of the output pixel, $\{\text{fraction }(27/64)\}^{th}$ of the output pixel, $\{\text{fraction }(63/64)\}^{th}$ of the output pixel, etc.). In other embodiments, pulse width values having more or less than six bits may be used.

Figure 3:
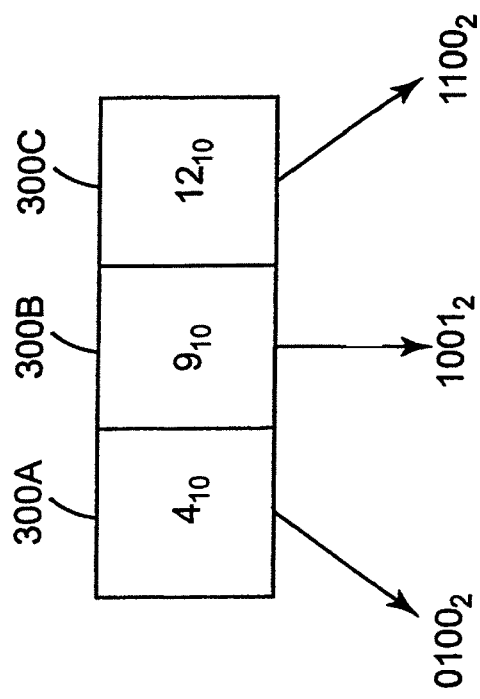
FIG. 3 is a diagram illustrating three adjacent pixels from a multi-bit image data file.

FIG. 3 is a diagram illustrating three adjacent pixels 300A-300C from multi-bit image data 114. As shown in FIG. 3, left pixel 300A has a decimal value of 4 (binary 0100), center (or "current") pixel 300B has a decimal value of 9 (binary 1001), and right pixel 300C has a decimal value of 12 (binary 1100).

In one embodiment, pcode generator 206 analyzes pixels in multi-bit image 114 in groups of three adjacent pixels, such as pixels 300A-300C. Pcode generator 206 is illustrated in block form in FIG. 2. Four embodiments of pcode generator 206 are illustrated in FIGS. 4A-4D, and are identified by reference numbers 206A-206D, respectively.

Figure 4A:
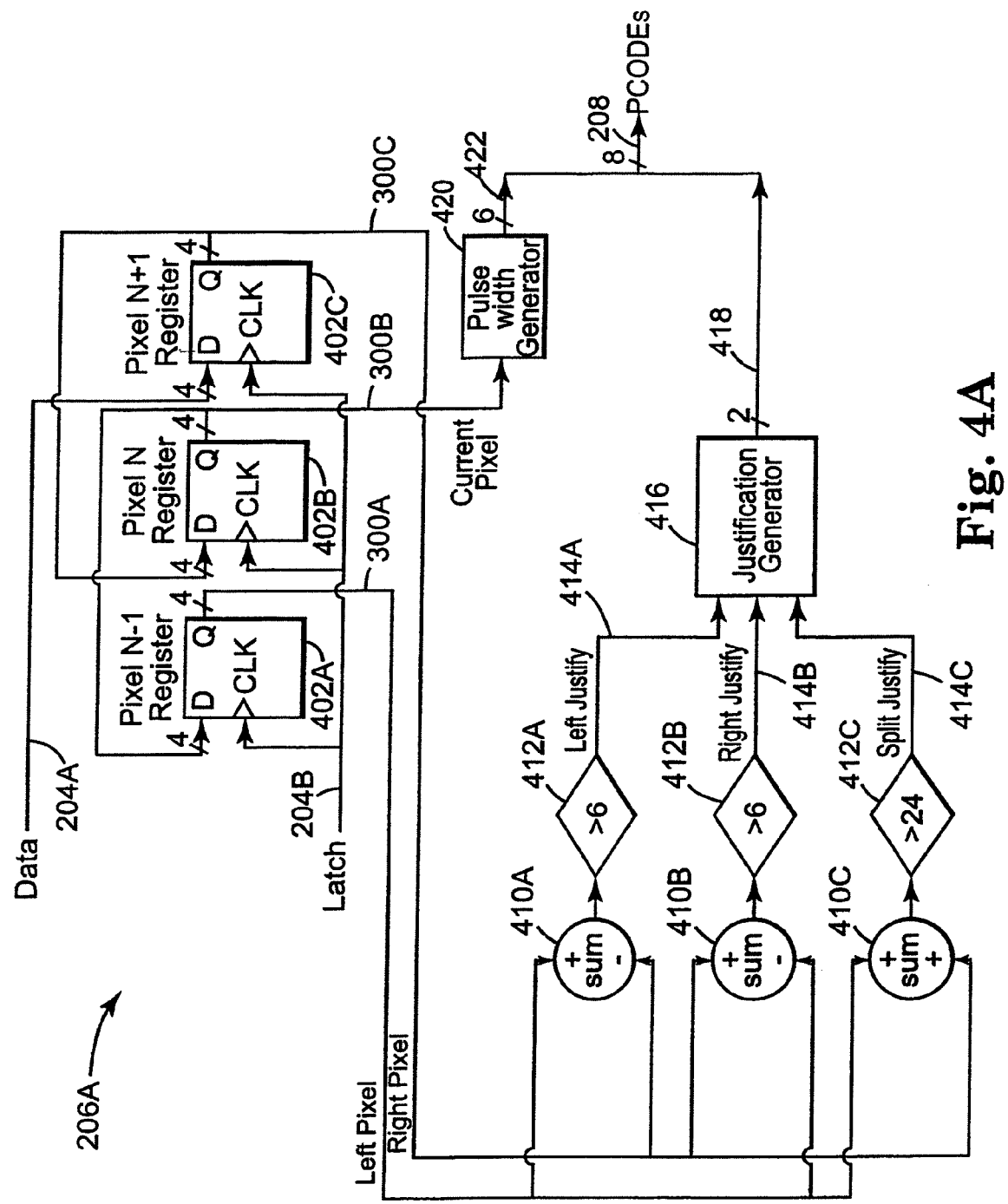
FIG. 4A is a block/schematic diagram illustrating a pcode generator according to one embodiment of the present invention.

FIG. 4A is a block/schematic diagram illustrating a pcode generator 206A according to one embodiment of the present invention. Pcode generator 206A includes registers 402A-402C (collectively referred to as registers 402), subtracters 410A and 410B, adder 410C, comparators 412A-412C (collectively referred to as comparators 412), justification generator 416, and pulse width generator 420. In one embodiment, each of the three registers 402 includes four D-type flip-flops, with each flip-flop having a data input D, a clock input CLK, and an output Q. DMA hardware 202 (shown in FIG. 2) outputs a data signal 204A to input D of register 402C. The output Q of register 402C is coupled to the input D of register 402B, and to adder 410C and subtracters 410A and 410B. The output Q of register 402B is coupled to the input D of register 402A, and to pulse width generator 420. The output Q of register 402A is coupled to adder 410C and subtracters 410A and 410B.

DMA hardware 202 reads the multi-bit image data 114 from printer memory 128, and outputs one pixel of data (e.g., 4 bits) at a time to input D of pixel register 402C. DMA hardware 202 also outputs a latch signal 204B, which is coupled to the clock input CLK of registers 402, to latch the data at the input D of each register 402 to the output Q of each register 402. Registers 402 are configured as a first-in first-out (FIFO) memory that shifts and holds pixels as they are clocked out of DMA hardware 202. Register 402B outputs a current pixel 300B (also referred to as Pixel N). The pixel 300C (also referred to as Pixel N+1) to the right of the current pixel 300B is output by register 402C. The pixel 300A (also referred to as Pixel N−1) to the left of the current pixel 300B is output by register 402A. Registers 402 essentially act as a three pixel wide sliding window that is moved one pixel at a time across multi-bit image 114, and that presents a left pixel 300A, current pixel 300B, and right pixel 300C, at each position of the window.

Pulse width generator 420 receives the current pixel 300B from register 402B, and generates a corresponding pulse width value 422 for the current pixel 300B. In one embodiment, pulse width generator 420 generates a 6-bit pulse width value 422 by concatenating the two most significant bits of the current pixel 300B to the least significant end of the four bits of the current pixel 300B. For example, using the value "1001" of the pixel 300B shown in FIG. 3, the pulse width 422 corresponding to this pixel would be "100110." This has the effect of scaling the pixel value, which provides a linear mapping between 4-bit pixel values and 6-bit pulse width values.

The generation of a pulse width value 422 from a current pixel 300B according to one embodiment can be represented by the pseudo code in the following Pseudo Code Example I:

Pseudo Code Example I pulse width=current pixel[3-0] & current pixel[3-2]

In another embodiment, a multiplier is used to generate the pulse width value 422 by multiplying the pixel value 300B by a scaling factor, such as an integer. For example, to generate a 6-bit pulse width value 422 from a 4-bit grayscale pixel value 300B, pulse width generator 420 multiplies the pixel value 300B by four. In another form of the invention, a fraction is used for the scaling factor (e.g., 63/15).

In another embodiment, pulse width generator 420 includes a look up table (e.g., a 16.times.6 random access memory (RAM) or 16 6-bit registers) that holds a mapping between 4-bit pixel values 300B (input address to the table) and 6-bit pulse width values 422 (output from the table). The 16.times.6 RAM provides 16 6-bit wide storage locations that are each uniquely addressable by the 4-bit input address. Each 6-bit wide storage location stores a 6-bit pulse-width value that identifies one of sixty-four pulse-widths. Based on a received 4-bit input address, the look up table outputs a 6-bit pulse-width value 422 for the current pixel 300B. Such a look-up table allows linear or non-linear mapping from grayscale pixel values 300B to pulse width values 422, depending on the values of the pulse-widths loaded into the look up table. Non-linear mapping may be desirable because more than a linearly proportional increase in laser drive pulse width may be needed to provide a suitable amount of toner to compensate for printer non-linearity and non-linearity of the average human visual sensitivity.

Subtracter 410A subtracts the value of the right pixel 300C from the value of the left pixel 300A, and outputs the difference (left pixel−right pixel) to comparator 412A. Comparator 412A determines whether the decimal value of the difference is greater than six, and outputs a left justify signal 414A to justification generator 416 if the difference is greater than six.

Subtracter 4101B subtracts the value of the left pixel 300A from the value of the right pixel 300C, and outputs the difference (right pixel−left pixel) to comparator 412B. Comparator 412B determines whether the decimal value of the difference is greater than six, and outputs a right justify signal 414B to justification generator 416 if the difference is greater than six.

Adder 410C adds the value of the right pixel 300C to the value of the left pixel 300A, and outputs the sum (left pixel+right pixel) to comparator 412C. Comparator 412C determines whether the decimal value of the sum is greater than twenty-four, and outputs a split justify signal 414C to justification generator 416 if the sum is greater than twenty-four.

Justification generator 416 generates and outputs a 2-bit justification value 418 for the current pixel 300B based on the signals 414A-414C output by comparators 412A-412C, respectively. If a left justify signal 414A is received from comparator 412A, justification generator 416 outputs a 2-bit value 418 corresponding to left justify (e.g., "10"). If a right justify signal 414B is received from comparator 412B, justification generator 416 outputs a 2-bit value 418 corresponding to right justify (e.g., "01"). If a split justify signal 414C is received from comparator 412C, justification generator 416 outputs a 2-bit value 418 corresponding to split justify (e.g., "11"). If justification generator 416 does not receive a signal from comparators 412A-412C, justification generator 416 outputs a 2-bit value 418 corresponding to center justify (e.g., "00"). If both the split justify signal 414C and the left justify signal 414A are received, the justification generator 416 outputs a 2-bit value 418 corresponding to left justify. If both the split justify signal 414C and the right justify signal 414B are received, the justification generator 416 outputs a 2-bit value 418 corresponding to right justify.

The determination of a justification value 418 from a left pixel 300A and a right pixel 300C according to one embodiment can be represented by the pseudo code in the following Pseudo Code Example II:

Pseudo Code Example II 1 if (left pixel−right pixel)>6 then LEFT JUSTIFY
  else if (right pixel−left pixel)>6 then RIGHT
  JUSTIFY else if (left pixel+right pixel)>24 then
  SPLIT JUSTIFY else CENTER JUSTIFY The combination of the 6-bit pulse width value 422 and the 2-bit justification value 418 is referred to as a pulse code 208, which is output to pulse width modulator 210 (shown in FIG. 2). In other embodiments, the pulse codes 208 are generated from look up tables, as shown in FIGS. 4B-4D, and described below.

In one embodiment, DMA 202 clocks several "0" pixel values through registers 402 at the beginning and the end of each line being printed, so the laser 214 is not turned on in the margin regions. From the perspective of DMA 202, registers 402 are one pixel behind (i.e., the first pixel does not show up in register 402B until the second pixel is strobed from DMA 202). This does not cause a problem since, in one form of the invention, the beginning and end of each line are padded with several pixels of value "0". In one embodiment, DMA 202 clocks pixels of value "0" through registers 402 during power-up. In another embodiment, registers 402 are reset during power-up, thereby clearing the registers 402.

Figure 4B:
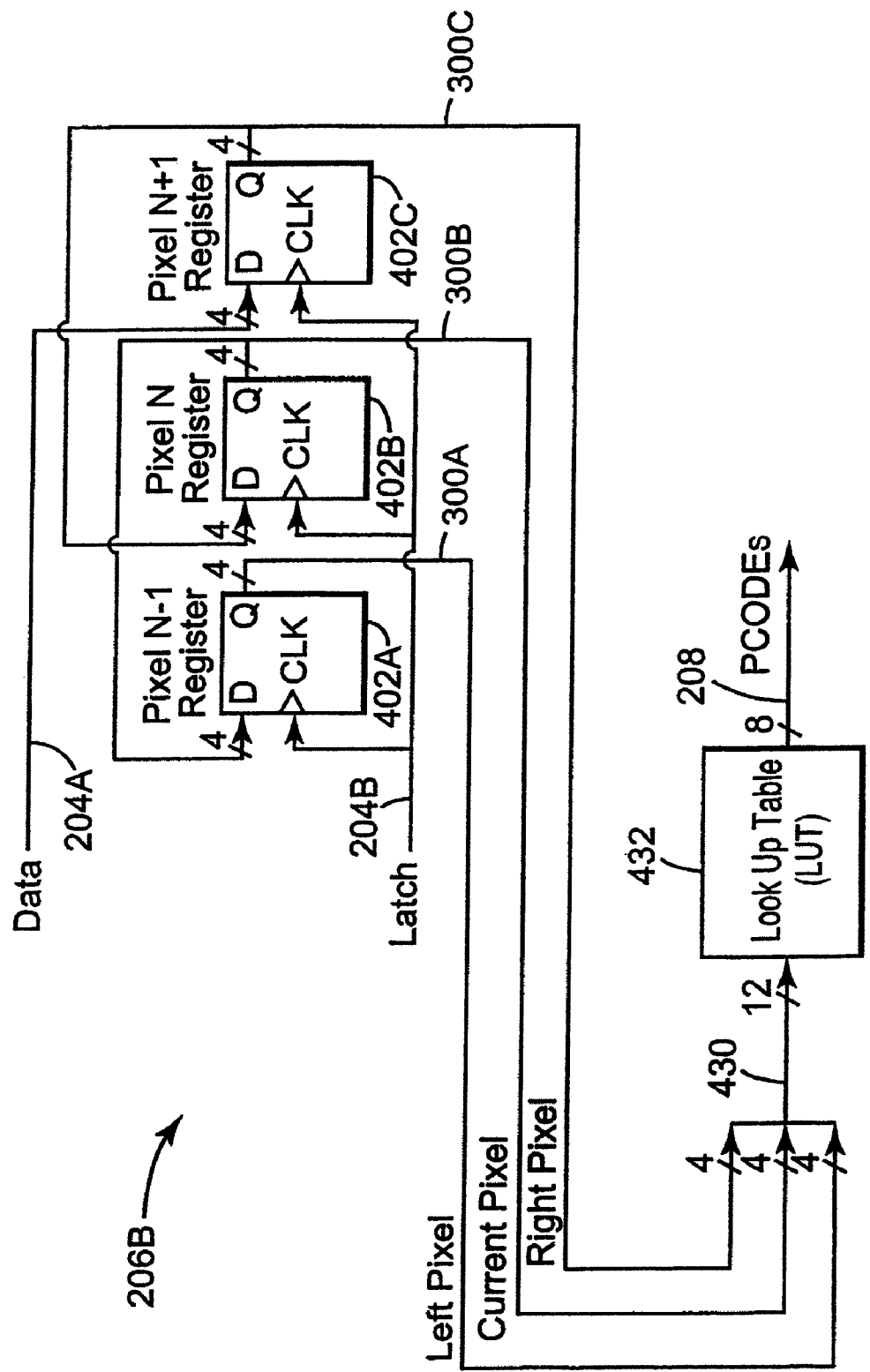
FIG. 4B is a block/schematic diagram illustrating a pcode generator according to a second embodiment of the present invention.

FIG. 4B is a block/schematic diagram illustrating a pcode generator 206B according to a second embodiment of the present invention. Pcode generator 206B includes registers 402A-402C (collectively referred to as registers 402), and look up table (LUT) 432. In the illustrated embodiment, registers 402 are configured as a first-in first-out (FIFO) memory in the same manner as shown in FIG. 4A, and shift and hold pixels as they are clocked out of DMA hardware 202. The values for the left pixel 300A (output by register 402A), current pixel 300B (output by register 402B), and right pixel 300C (output by register 402C) are provided to look up table 432. The combination of the four bits for each of these three pixels 300A-300C results in a 12-bit input address 430 to look up table 432. In one embodiment, look up table 432 is a 4096.times.8 RAM, which provides 4096 8-bit wide storage locations that are each uniquely addressable by the 12-bit input address 430. Each 8-bit wide storage location stores an 8-bit pcode 208. Based on the received 12-bit input address 430, look up table 432 outputs an 8-bit pcode 208 for the current pixel 300B to pulse width modulator 210. Depending on the values of the pcodes 208 loaded into look up table 432, a linear mapping from pixel values to pulse widths may be provided, or a non-linear mapping may be provided to compensate for the non-linearity of the printing process.

Figure 4C:
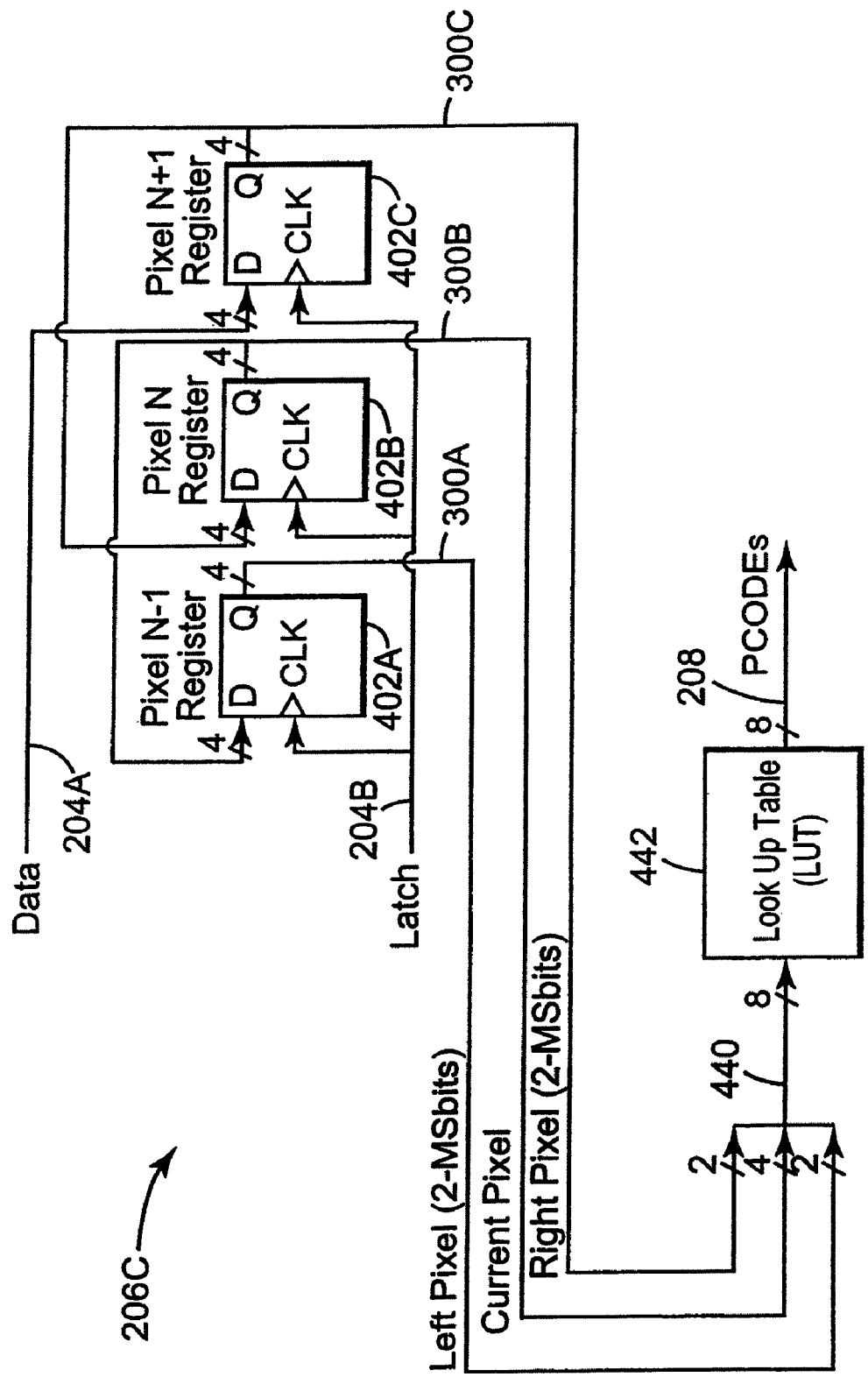
FIG. 4C is a block/schematic diagram illustrating a pcode generator according to a third embodiment of the present invention.
Figure 4D:
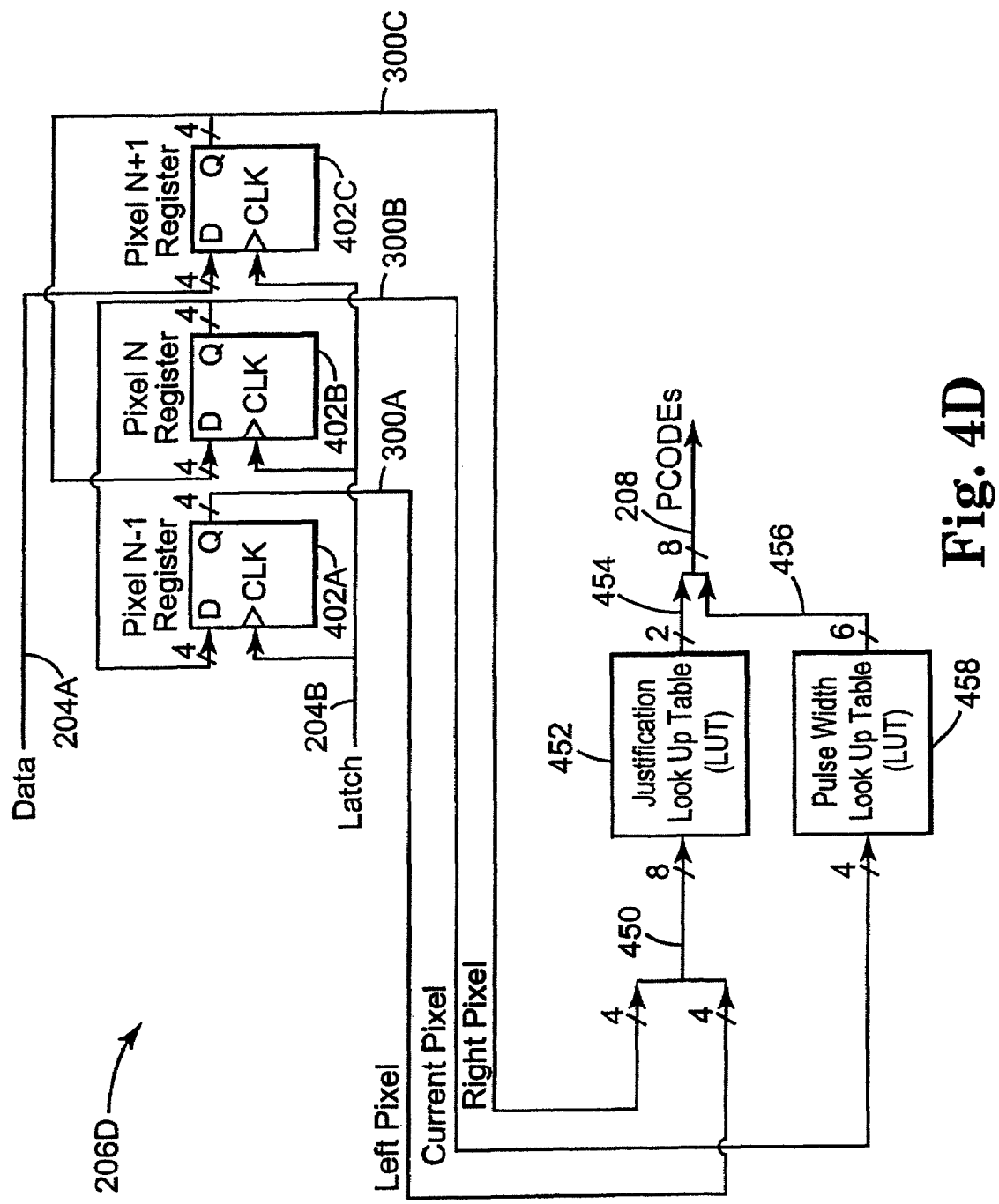
FIG. 4D is a block/schematic diagram illustrating a pcode generator according to a fourth embodiment of the present invention.

FIG. 4C is a block/schematic diagram illustrating a pcode generator 206C according to a third embodiment of the present invention. Pcode generator 206C includes registers 402A-402C (collectively referred to as registers 402), and look up table (LUT) 442. In the illustrated embodiment, registers 402 are configured as a first-in first-out (FIFO) memory in the same manner as shown in FIGS. 4A and 4B, and shift and hold pixels as they are clocked out of DMA hardware 202. The two most significant bits of the left pixel 300A (output by register 402A), the four bits of the current pixel 300B (output by register 402B), and the two most significant bits of the right pixel 300C (output by register 402C) are provided to look up table 442. The combination of the bits for each of these three pixels 300A-300C results in an 8-bit input address 440 to look up table 442. In one embodiment, look up table 442 is a 256.times.8 RAM, which provides 256 8-bit wide storage locations that are each uniquely addressable by the 8-bit input address 440. Each 8-bit wide storage location stores an 8-bit pcode 208. Based on the received 8-bit input address 440, look up table 442 outputs an 8-bit pcode 208 for the current pixel 300B to pulse width modulator 210. Because the two most significant bits of the left pixel 300A and right pixel 300C are used in addressing look up table 442, rather than all four bits of these pixels 300A and 300C as is done in the embodiment shown in FIG. 4B, a smaller (and less expensive) RAM may be used for lookup table 442, at the expense of less resolution. If a finer resolution is desired, more bits of pixels 300A and 300C can be used to address the look up table. Depending on the values of the pcodes 208 loaded into look up table 442, a linear mapping from pixel values to pulse widths may be provided, or a non-linear mapping may be provided to compensate for the non-linearity of the printing process.

FIG. 4D is a block/schematic diagram illustrating a pcode generator 206D according to a fourth embodiment of the present invention. Pcode generator 206B includes registers 402A-402C (collectively referred to as registers 402), and look up tables (LUTs) 452 and 458. In the illustrated embodiment, registers 402 are configured as a first-in first-out (FIFO) memory in the same manner as shown in FIGS. 4A-4C, and shift and hold pixels as they are clocked out of DMA hardware 202. The values for the left pixel 300A (output by register 402A) and the right pixel 300C (output by register 402C) are provided to justification look up table 452. The combination of the four bits for each of these two pixels 300A and 300C results in an 8-bit input address 450 to look up table 452. In one embodiment, look up table 452 is a 256.times.2 RAM, which provides 256 2-bit wide storage locations that are each uniquely addressable by the 8-bit input address 450. Each 2-bit wide storage location stores a 2-bit justification value that identifies one of four justifications (e.g., left justify, right justify, center justify, and split justify). Based on the received 8-bit input address 450, look up table 452 outputs a corresponding 2-bit justification value 454 for the current pixel 300B.

The value for the current pixel 300B (output by register 402B) is provided as a four bit input address to pulse-width look up table 458. In one embodiment, look up table 458 is a 16.times.6 RAM, which provides 16 6-bit wide storage locations that are each uniquely addressable by the 4-bit input address. Each 6-bit wide storage location stores a 6-bit pulse-width value that identifies one of sixty-four pulse-widths. Based on a received 4-bit input address, look up table 458 outputs a 6-bit pulse-width value 456 for the current pixel 300B. Depending on the values of the pulse-widths loaded into look up table 458, a linear mapping from pixel values to pulse widths may be provided, or a non-linear mapping may be provided to compensate for the non-linearity of the printing process.

The combination of the 2-bit justification 254 output by look up table 452 and the 6-bit pulse width 456 output by look up table 458, is an 8-bit pcode 208 for the current pixel 300B, which is provided to pulse width modulator 210.

Figure 5:
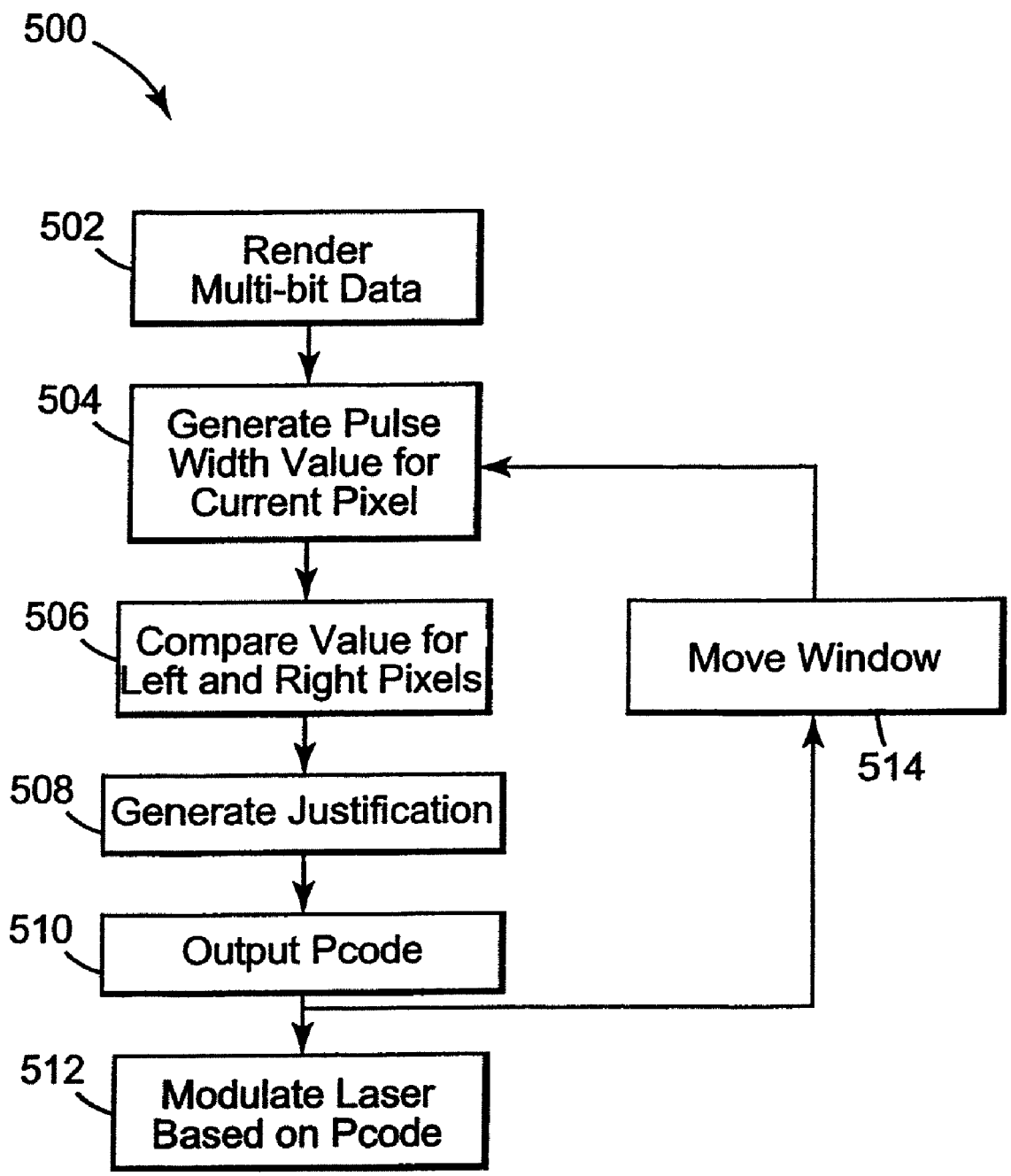
FIG. 5 is a flow diagram illustrating a method for generating pcodes from multi-bit image data according to one embodiment of the present invention.

FIG. 5 is a flow diagram illustrating a method 500 for generating pcodes 208 from multi-bit image data 114 according to one embodiment of the present invention. In one embodiment, computer 102 and printer 120 are configured to perform method 500. In step 502, data 112 to be printed by printer 120 is rendered into multi-bit image data 114. In one embodiment, the data 112 to be printed is rendered into multi-bit image data 114 by computer 102, and then output to printer 120. In another embodiment, the data 112 to be printed is rendered into multi-bit image data 114 by printer 120.

In step 504, a pulse width value is generated for a current pixel 300B in the multi-bit image data 114. In one embodiment, the pulse width value is generated by concatenating at least one most significant bit of the current pixel 300B to the least significant end of the bits of the current pixel 300B. In another embodiment, the pulse width value is generated by multiplying the value of the current pixel 300B by an integer. In yet another embodiment, the pulse width value is obtained from a look up table that associates pixel grayscale values with pulse width values. In one form of the invention, rather than generating the pulse width value based on the value of the center pixel 300B in a set of three adjacent pixels 300A-300C, the pulse width value for the pixel 300B is generated based on the value of all three pixels 300A-300C.

In step 506, the value of the pixel 300A to the left of the current pixel 300B and the value of the pixel 300C to the right of the current pixel 300B are compared. In step 508, a justification value is generated based on the comparison of the left and the right neighboring pixels performed in step 506. In one embodiment, the justification value is generated by performing arithmetic operations on the values of the left and right pixels, and comparing the results of the arithmetic operations to threshold values. In another embodiment, the justification value is obtained from a look up table that associates pixel grayscale values with justification values.

In step 510, a pcode 208 is output to a pulse width modulator 210. In one embodiment, the pcode 208 includes the pulse width value generated in step 504, and the justification value generated in step 508. In step 512, the laser 214 in printer 120 is modulated based on the pcode 208 output in step 510.

As mentioned above, registers 402 essentially act as a three pixel wide sliding window that is moved one pixel at a time across multi-bit image 114, and that presents a left pixel 300A, current pixel 300B, and right pixel 300C, at each pixel position. In step 514 of method 500, the sliding window is moved to the right one pixel position, and the method returns to step 504. Thus, the previous left pixel 300A falls outside the window, the previous current pixel 300B becomes the new left pixel 300A, the previous right pixel 300C becomes the current pixel 300B, and the pixel to the right of the previous right pixel 300C becomes the new right pixel 300C. After each move of the sliding window, steps 504-512 are repeated to generate a pcode 208 for the center pixel 300B in the window.

It will be understood by a person of ordinary skill in the art that functions performed by computer 102 or printer 120 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

One form of the present invention provides a method of generating high quality enhanced resolution printed images without implementing a large block of dedicated resolution enhancement technology (RET) hardware, or a RET-like function of template matching with pcode replacement. In one embodiment, justification information is derived by the printer "on the fly" from pixel grayscale data based on surrounding pixels, which eliminates the need to generate 1-bit halftone data and transfer the halftone data to a RET application specific integrated circuit (ASIC). In one form of the invention, justification information for a current pixel is derived based on two adjacent pixels (e.g., a pixel to the left and pixel to the right of the current pixel), so there is no need to buffer lines of data.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A laser print apparatus comprising:
   a memory to store a multi-bit image including a plurality of pixels, each pixel represented by an N-bit value;
   a modulation code generator to generate a pulse width value, the pulse width value represented by an M-bit value, the modulation code generator linearly mapping the N-bit value to the M-bit value; and
   a laser print engine to form an output pixel on media based on the pulse width value, wherein the modulation code generator is operative to concatenate at least one most significant bit of a current pixel to a least significant end of a justification value for the current pixel.

2. The laser print apparatus of claim 1 wherein the modulation code generator is operative to concatenate a portion of the current pixel to the justification value of the current pixel to form the M-bit value for the pulse width value for the current pixel.

3. The laser print apparatus of claim 1 wherein the modulation code generator is operative to generate a justification value for the output pixel based on values of pixels adjacent to the current pixel.

4. The laser print apparatus of claim 1, wherein the laser print engine comprises:
   a laser configured to be modulated for the output pixel so as to be turned on and off at times corresponding to the justification value for the output pixel, and remain on for a time period corresponding to the pulse width value for the output pixel.

5. The laser print apparatus of claim 1, wherein N=4.

6. The laser print apparatus of claim 1 wherein the pulse width value is a 6-bit value.

7. A method for generating modulation data for modulating a laser in a laser print apparatus, the method comprising:
   rendering data to be printed into a multi-bit image including a plurality of pixels, each pixel represented by a multi-bit pixel value;
   for each pixel, linearly mapping the multi-bit pixel value to generate a pulse width value,
   wherein generating the pulse width value comprises concatenating for the each pixel one or more most significant bits of the multi-bit pixel value to a least significant end of the multi-bit pixel value.

8. The method of claim 7 further comprising:
   generating a justification value for each pixel based on the values of the each pixel and an adjacent pixel; and
   providing the pulse width value and the justification value for the each pixel to a laser print engine to form a pixel.

9. The method of claim 8 further comprising:
   turning on and turning off a laser at times defined by the justification value and turning the laser on for a period defined by the pulse width value.

10. The method of claim 7 wherein generating the pulse width value comprises scaling the multi-bit pixel value by combining the multi-bit pixel value with a portion of the multi-bit pixel value.

11. The method of claim 7 wherein generating the pulse width value comprises generating a 6-bit value from a 4-bit pixel value.

12. A laser print apparatus comprising:
- a memory to store data defining an image including a plurality of pixels, each pixel of the image being represented by a multi-bit value;
- a first modulation code generator in communication with the memory to generate a pulse width value for each pixel in the image by appending a first portion of the multi-bit value for the each pixel to a second portion of the multi-bit value for the each pixel;
- a second modulation code generator in communication with the memory to generate a justification value for each pixel in the image based on the multi-bit values of pixels adjacent to the each pixel; and
- a laser print engine in communication with the first modulation code generator and the second modulation code generator to form an image on media based on the pulse width value and the justification value.

13. The laser print apparatus of claim 12 wherein the modulation code generator is operative to scale an N-bit value for the each pixel to an M-bit value for the generated pulse width value.

14. The laser print apparatus of claim 13 wherein N=4 and M=6.

15. The laser print apparatus of claim 12 wherein the justification value comprises a 2-bit value representing one of left justify, right justify, split justify, and center justify.

16. A laser print apparatus comprising:
- means for storing data defining a multi-bit image including a plurality of pixels, each pixel represented by an N-bit value, wherein N is greater than one;
- means for generating a pulse width value for each pixel in the multi-bit image by appending a first portion of the N-bit value for the each pixel to a second portion of the N-bit value for the each pixel;
- means for generating a justification value based on the values of pixels adjacent to the each pixel; and
- means for forming an output pixel on media based on the pulse width value and the justification value.

17. The laser print apparatus of claim 16 wherein the justification value comprises a 2-bit value representing one of left justify, right justify, split justify, and center justify.

18. The laser print apparatus of claim 16, wherein N=4 and wherein the pulse width value is a 6-bit value.

19. A laser print apparatus comprising:
- means for storing data defining a multi-bit image including a plurality of pixels, each pixel represented by an N-bit value, wherein N is greater than one;
- means for generating a pulse width value for each pixel in the multi-bit image by concatenating a most significant portion of the N-bit value for the each pixel to a least significant portion of the N-bit value for the each pixel; and
- means for forming an output pixel on media based on the pulse width value.

20. The laser print apparatus of claim 19 further comprising:
- means for generating a justification value based on the values of the each pixel, a left pixel to a left of the each pixel, and a right pixel to a right of the each pixel.

21. The laser print apparatus of claim 20 wherein the means for generating comprises:
- first subtracting means for subtracting the value of the right pixel from the value of the left pixel to generate a first difference;
- second subtracting means for subtracting the value of the left pixel from the value of the right pixel to generate a second difference; and
- add means for adding the value of the left pixel and the value of the right pixel to generate a sum.

22. The laser print apparatus of claim 21, wherein the means for generating further comprises:
- comparator means for comparing the first difference to a first threshold value, for comparing the second difference to a second threshold value, and for comparing the sum to a third threshold value; and
- justification code generating means for generating the justification value based on results of the comparisons made by the comparator means.

23. The laser print apparatus of claim 21 wherein the means for generating a pulse width value generates a justification value indicating left justify if the first difference is greater than the first threshold, generates a justification value indicating right justify if the second difference is greater than the second threshold, generates a justification value indicating split justify if the sum is greater than the third threshold, and generates a justification value indicating center justify if none of the first, second, or third thresholds is exceeded.

* * * * *